United States Patent [19]

Bock

[11] 4,071,939
[45] Feb. 7, 1978

[54] METHOD OF MOUNTING A HANDLE ON A PAIL

[75] Inventor: Erik Bock, Slangerup, Denmark

[73] Assignee: Superfos Emgallage A/S, Denmark

[21] Appl. No.: 723,721

[22] Filed: Sept. 16, 1976

Related U.S. Application Data

[62] Division of Ser. No. 313,658, Dec. 11, 1972, abandoned.

[51] Int. Cl.² ............................................. B23P 19/00
[52] U.S. Cl. ........................................ 29/434; 29/453; 113/120 J; 220/91
[58] Field of Search ............... 29/453, 235, 774, 434; 220/91; 113/120 J

[56] References Cited

U.S. PATENT DOCUMENTS

| 472,130 | 4/1892 | Lusk | 220/91 |
| 1,948,202 | 2/1934 | Chapman | 220/91 |
| 2,046,777 | 7/1936 | Geibel | 220/91 X |
| 3,195,228 | 7/1965 | Beacham | 29/774 X |
| 3,419,196 | 12/1968 | Moore | 220/95 X |
| 3,513,533 | 5/1970 | Nauta | 29/774 X |

Primary Examiner—Charlie T. Moon
Attorney, Agent, or Firm—Bucknam and Archer

[57] ABSTRACT

A pail having diametrically opposed recesses or apertures for receiving inwardly directed pins projecting at the ends of a handle; said recesses or apertures each having a narrowed section behind which the head of the pin can be introduced when the pin is passed through the recess. The narrowed section opens laterally towards an opening, so that the pin of the handle is brought into position by a movement in a transverse direction of the pail axis.

2 Claims, 4 Drawing Figures

Fig. 1
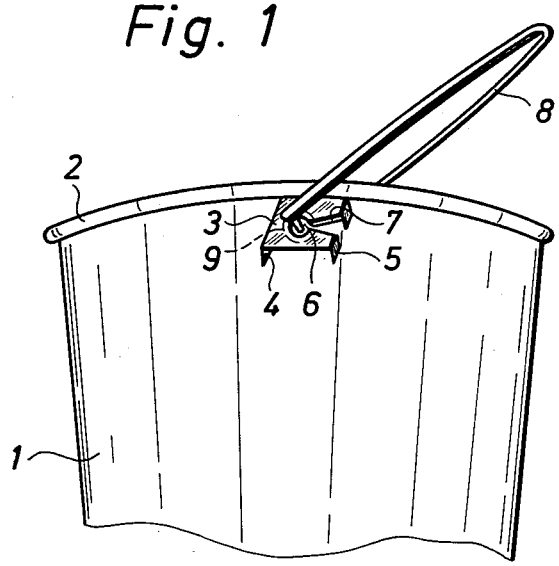
Fig. 2    Fig. 4
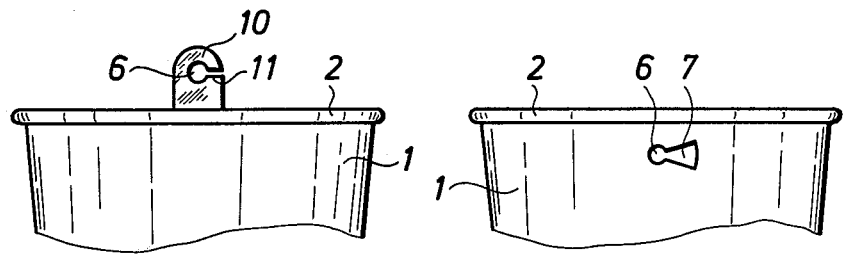
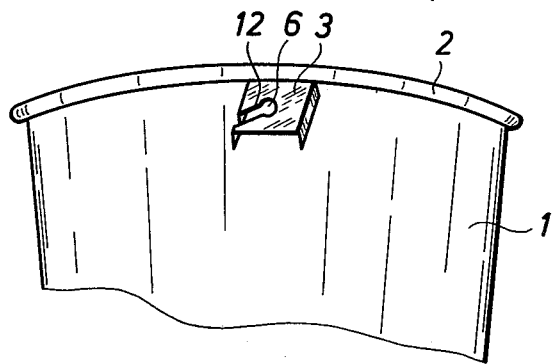
Fig. 3

METHOD OF MOUNTING A HANDLE ON A PAIL

This is a division of application Ser. No. 313,658 filed Dec. 11, 1972, now abandoned.

The invention relates to a pail having recesses provided diametrically opposite each other near the upper edge, the said recesses being so formed that the head of an inwardly directed pin provided at the end of a handle may be passed through the recess into position behind a narrowed section of same so that the inwardly directed pins of the handle extend through and are pivotally supported in the narrowed sections.

In the manufacture of plastics pails with handle it is common to mount the handles while the material is still in its plasticised condition by forcing the heads of the inwardly directed pins of the handles through the eye-formed holes, the diameter of which is less than the pin heads so that the pins cannot be withdrawn when the material has solidified. For many purposes, however, it is desirable not to provide the pails with handles pending solidification of the material, for example when the surface of the pail is to be provided with imprints, e.g. by the method of silk screen printing, or with other forms of imprint. The handles are therefore often supported in downwardly directed lugs, moulded beneath the upper edge of the pail, the said lugs having recesses of keyhole form with its widened section for introducing the handle pins opening into the downwardly directed edge of the lug. The handles may then be mounted on the individual pail whenever it is convenient. All the same the said arrangement has certain drawbacks since it is impossible to mount the handles mechanically by a simple movement and not possible at all to mount them on a number of pails stacked so closely in telescope-fashion that the lower edges of the eyes are resting against the upper edge of the surrounding pail.

This problem is solved according to the invention in that the narrowed section of the recess is open sideways towards an opening for introducing the pin of the handle so that the pins may be brought into position by a movement in the transverse direction of the pail. By this simple arrangement it is possible to mount handles on pails stacked or telescoped closely into one another and to mount the handles on the pails automatically by means of a machine which advances the handles in the transverse direction of the pails. Further it has become possible according to the invention to mount handles in pails of rigid material, such as solidified plastics material or metal, and stacked closely in telescope-fashion, even though the handles are to be attached to eyes or lugs extending upwardly from the upper edge of the pail.

Even though the recesses according to the invention, if the pail is not to be densely sealed, may simple be made as "lying" keyholes in the wall of the pail, the recesses according to the invention will, however, usually be formed in lugs and open into a side edge of the lug so that the handle may be mounted by a pure transversely directed movement without the heads of the pins having at first to be passed radially inwards through the widened sections of the recesses.

To facilitate the insertion of the pins into the narrowed section of the recesses, the said section may according to the invention through a passage of a cross-section less than the diameter of the pin inside the head join a section for inserting the handle that is widening towards the side edge. To ensure the maximum efficiency of retention of the handle the said section for introducing the pin may, however, also according to the invention be formed as a narrow slit extending from the narrowed section of the recess obliquely downwards and outwards to the side edge of the lug.

The invention will now be described in detail with reference to the drawing, in which FIG. 1 shows a part of a pail according to the invention, provided with handle, viewed from the side, and FIG. 2–4 partial views of various embodiments of the pail according to the invention, without handle.

The pail shown in FIG. 1 has in usual manner a side wall 1 limited at its upper end by a rounded edge 2. The side wall 1 has diametrically opposite to each other two moulded, downwardly directed lugs 3 of which only one is visible in the drawing. The side edges of the lug 3 are in usual manner supported at a distance from the side wall 1 of the pail by means of lateral tabs 4 and 5 and the lug itself is provided with a keyhole slot comprising a circular portion 6 and a tail 7 for introducing the pins of the handle, the said section 7 extending to the edge of the lug at the lateral tab 5 which is cut away. A handle 8 is pivotably mounted on the pail; pins with heads 9 directed inwardly from the ends of the handle by a movement at right angles to the longitudinal axis of the pail are passed through the section 7 into the circular section 6 of the recess so that the pins themselves are pivotably supported in the said section, whereas their heads engage behind the lugs 3. Mounting of the handle in this way may be performed even though several pails are stacked or telescoped very closely with the underside of the lugs 3 resting on the upper edge 2 of the following pail.

FIG. 2 shows a pail having lugs 1o projecting from the upper edge 2 of the pail. The handle may be supported in the said lugs by means of pins directed inwardly or outwardly from the ends and passed through a narrow tail 11 into the circular section 6 of the recess. If the pail is of an elastic material, the slit 11 may be of a transverse dimension slightly smaller than the diameter of the pins of the handle so that they are retained in their position. To prevent unintended withdrawal of the handle, it may, however, be convenient to form the tail 12 as shown in FIG. 3, in which the recess is arranged in a downwardly directed lug. The handle may also here be mounted by being introduced in a rectilinear movement and it is protected against unintended withdrawal or dislocation by shocks in horizontal direction.

Ordinary pails that are not to be perfectly sealed may as illustrated in FIG. 4 simply be provided with "lying" keyhole recesses provided in the wall of the pail. When the handle or the pail is slightly resilient or the pail has a small diameter, the handle may also be mounted by introducing it in a sheer rectilinear movement.

I claim:

1. The method of mounting the handle into a plurality of pails, said pails comprising means for mounting the handles, said means comprising recesses diametrically opposite to each other at the upper edge of said pails, said recesses being keyhole shaped slots transverse with respect to the axis of the pails, said handles being provided with pins and heads at the ends thereof, said slots comprising a circular section for pivotally mounting the heads of the pins and a tail, which comprises the steps of stacking the pails telescopically, and advancing the handles in a direction transverse to the vertical axis of the pails whereby the pins enter the tail section of said slots and the heads of the pins remain pivotally mounted in the circular section of the slots.

2. The method according to claim 1 wherein the heads of said pins of the handles are directed inwardly, said slots are formed in two diametrically opposite lugs and the heads are held behind said lugs.

* * * * *